April 20, 1954
E. MORF
2,675,668
BEARING FOR GEAR WHEELS IN TIMEPIECES
Filed Oct. 28, 1949
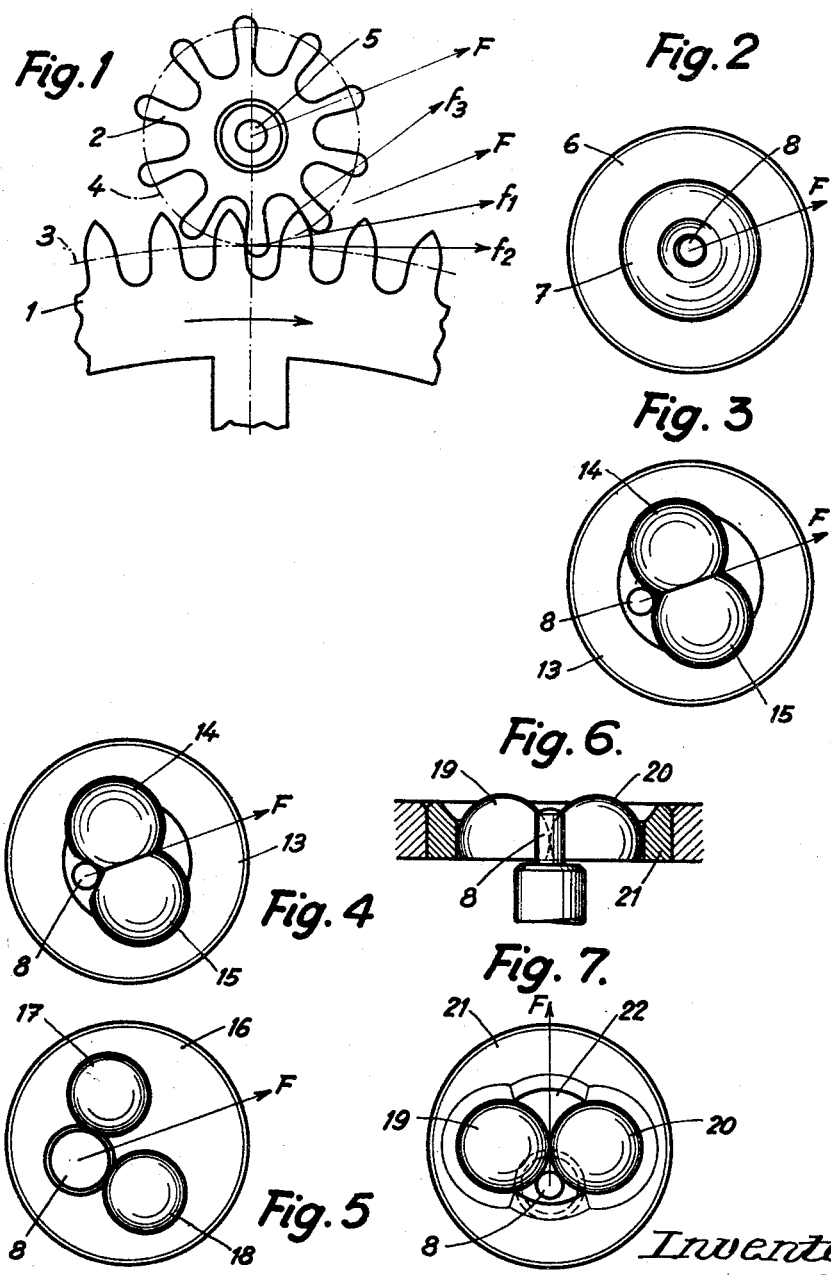
Inventor
E. Morf Patented Apr. 20, 1954

2,675,668

UNITED STATES PATENT OFFICE 2,675,668

BEARING FOR GEAR WHEELS IN TIMEPIECES

Ernest Morf, La Chaux-de-Fonds, Switzerland

Application October 28, 1949, Serial No. 124,141

Claims priority, application Switzerland April 14, 1949

9 Claims. (Cl. 58—140)

My invention relates to bearings for gear wheels in watches, clocks and other precision apparatus.

In watches, clocks, counters and other precision apparatus the movable parts have hitherto been pivoted in bearings having a pierced jewel. The manufacture of these pierced jewels requires much time and is very difficult and the cost price is extremely high. It has also been tried to avoid jewelling certain bearings in an attempt to reduce the price of the watches, but the quality of the article has thereby been deteriorated.

My invention aims at the manufacture of bearings of high quality at a reduced cost price and is based on the following consideration:

When the working surfaces of a bearing are relatively soft, the hole receiving the pivot becomes oval after a certain working time. If a movable part always turns in the same direction as is the case with gear wheels, but not the case with the balance of watches or clocks, the force exerted on a driven pinion by a driving gear wheel has a direction which is not far from the tangent to the pitch circles in their point of contact. This direction varies during the contact between two teeth and oscillates between two limit values forming an angle of 20 to 30° between them. The axle of the pinion is thus always forced towards the same side of the bearing.

To carry my invention into effect I provide walls of the space receiving the pivot, which are only in part made of jewels.

It is therefore an object of this invention to provide a jeweled bearing having a pivot receiving thrust forces in a given direction transversely of the pivot axis and which embodies a metallic plate-like setting having an aperture therethrough the edges of which include or define two jewel engaging surfaces which face one another along a straight line through the plane of the setting that is perpendicular to the line containing the median line of thrust that acts on a pivot to be supported by the bearing and which bearing further has jewels frictionally held in the aperture and in engagement with the surfaces and the edge of the aperture further including a surface spaced from the jewels along the line containing the median line of thrust and delimiting a pivot receiving area to one side of the center of the setting.

Other objects and features will be apparent as the following description proceeds, reference being had to the accompanying drawing illustrating by way of example several embodiments of my invention, and wherein Fig. 1 shows the variation of the direction of the force exerted on a pinion by a gear wheel in mesh with it.

Figure 2 is a plan view on an enlarged scale illustrating the conventional jeweled bearing.

Figures 3 and 4 illustrate two embodiments of the invention each provided with two jewel members contacting each other.

Figure 5 illustrates a modification of the invention adapted for use with a pivot of relatively large diameter; and Figures 6 and 7 are respective sectional and plan views of another embodiment of the invention provided with two jewel members of generally spherical shape.

Referring now to Fig. 1, a gear wheel 1 meshes with a pinion 2. The pitch circles of these wheels are designated by 3 and 4. The wheel 1 exerts a force on the pinion 2, different directions of which varying according to contact of the teeth are indicated by arrows $f_1$, $f_2$, and $f_3$. These forces during contact of two teeth oscillate about a median direction or line of thrust F between two limit positions forming between them an angle of about 20 to 30°. The force along line F acts upon the axle 5 of the pinion and presses it always towards the same side of the bearing.

Fig. 2 illustrates a usual jeweled bearing well known in the art, comprising a metal setting 6 into which a pierced ruby jewel 7 has been forced. A pivot 8 turns in the hole of this jewel and, under the constraint of the force along median line F, shown in Fig. 1, always bears against the same side of the hole of the jewel 7. The pivot 8 is completely surrounded by the ruby jewel 7.

In my bearings as shown in Figs. 3 and 4, two ruby or other jewel members 14 and 15 contacting each other are forced in and frictionally held in a metallic setting 13. The circumference of these ruby members form together an angle against the sides of which the pivot 8 bears. In Fig. 3 these sides are curved, while in Fig. 4 they are flat.

My bearing as shown in Fig. 5 serves to receive a pivot of relatively large diameter. It has a metallic setting 16 with three holes, in two of which are frictionally held cylindrical or spherical ruby or other jewels 17 and 18 having curved surfaces against which the pivot 8 bears. In other words, the arrangement of Figure 5 presents a jeweled bearing which comprises a metallic plate-like setting 16 having what amounts to a multi-lobed aperture therethrough the lobes of which respectively accommodate the jewels 17 and 18 and the pivot 8. The three lobes are each defined by arcs of circles extending through angles greater than 180° and constitute in effect three openings with two of the openings being jewel receiving openings and the third opening adapted to receive the pivot 8 and being in communication with the first two openings.

Referring to Figs. 6 and 7, two spherical ruby or other jewel segments 19 and 20 are forced into and frictionally held in an elongated opening 22 of a metallic setting 21. This embodiment represents a jeweled bearing which may be manufactured at relatively low cost and with perfectly polished working surfaces. These latter being convex they offer the pivot a minimum friction. The curvilinear triangle formed by the ruby segments 19 and 20 and the pivot 8 provide for a perfect holding of the lubricant on the turning parts.

In all the embodiments of my invention shown and referred to above, the pivot, on a slight shock or on a stopping of the watch or clock or precision apparatus will be held in place by the wall of the metallic setting facing the jewels.

It is therefore clear that the present invention embodies a jeweled bearing particularly for accommodating the pivot of a gear wheel or pinion of a watch, clock, or other precision type apparatus which comprises a metallic plate-like setting having an aperture therethrough, the edges of which include two jewel engaging surfaces forming lobes that face one another or have centers lying on a straight line through the plane of the setting that is perpendicular to the line containing the median line of thrust that acts on a pivot to be supported by the bearing. Jewels are frictionally held in the aperture in engagement with the said surfaces or in other words, two lobes constitute jewel receiving lobes. In Figures 3, 4 and 7, the jewels contact each other along a portion of their exteriors whereas as previously described with reference to Figure 5, the aperture through the plate, in effect, constitutes three openings, two of which have centers lying along the straight line and receiving the jewels. The aperture further has another surface or lobe spaced from the jewels along the line containing the median line of thrust which delimits a pivot receiving area that is to one side of the center of the setting so that a pivot lying in this area will be contactable with only portions of the jewels when under thrust and the last mentioned edge of the aperture as well as that part of the setting adjacent the same will hold a pivot in place on shock or on stopping the apparatus embodying the bearing.

It is therefore clear from the drawings that I have provided a bearing structure for use with a pivot shaft which receives thrust forces in a given direction along a line that is transverse with respect to the axis of the shaft. This bearing structure comprises means surrounding the pivot shaft and which means will include one metallic portion and two jewel portions. The latter portions presenting surfaces that define an angle on the sides of which the pivot shaft will be normally thrust.

While I have described and illustrated some embodiments of my invention, I do not wish to unnecessarily limit the scope of my invention, but reserve the right to make such modifications and rearrangements of the several parts as may come within the purview of the accompanying claims.

What I claim is:

1. A jeweled bearing comprising a metallic plate-like setting having a multi-lobed aperture therethrough including two jewel receiving lobes having centers lying on a straight line through the plane of the setting, that is perpendicular to the line containing the median line of thrust acting on a pivot to be supported by the bearing, jewels frictionally held in said two lobes, and a third lobe delimiting a pivot receiving area lying in the line containing said median line of thrust and being to one side of the center of the setting so that a pivot lying in the said area of the third portion will be contactable only with portions of said jewels when under thrust and the part of the setting adjacent the pivot receiving area holding a pivot in place on shock or on a stopping of the apparatus embodying the bearing.

2. A jeweled bearing as defined in and by claim 1, in which the setting is circular in plan and said jewels and at least said first two lobes being substantially circular.

3. A jeweled bearing as defined in and by claim 1, in which the portions of the jewels contacted by the pivot are arcuate.

4. A jeweled bearing as defined in and by claim 1, in which the three lobes of the aperture are each defined by arcs of circles extending through angles greater than 180° to constitute in effect three openings, two of said openings being jewel receiving openings and the third opening which is adapted to receive the pivot being in communication with the first two openings.

5. A jeweled bearing comprising a metallic plate-like setting having a multi-lobed aperture therethrough including two jewel receiving lobes having centers lying on a straight line through the plane of the setting, that is perpendicular to the line containing the median line of thrust acting on a pivot to be supported by the bearing, jewels frictionally held in said two lobes in contact with each other along a portion of their exteriors, and a third lobe delimiting a pivot receiving area lying in the line containing said median line of thrust and being to one side of the center of the setting so that a pivot lying in the said area of the third portion will be contactable only with portions of said jewels when under thrust and the part of the setting adjacent the pivot receiving area holding a pivot in place on shock or on a stopping of the apparatus embodying the bearing.

6. A jeweled bearing as defined in and by claim 5 in which the portions of the jewels in contact with each other are flat.

7. A jeweled bearing as defined in and by claim 6 in which the portions of the jewels contacted by the pivot are flat.

8. A jeweled bearing as defined in and by claim 5 in which the portions of the jewels in contact with each other are arcuate.

9. A jeweled bearing comprising a metallic plate-like setting having an aperture therethrough, the edges of the aperture including two jewel engaging surfaces facing one another along a straight line through the plane of the setting that is perpendicular to the line containing the median line of thrust acting on a pivot to be supported by the bearing, jewels frictionally held in the aperture and in engagement with said surfaces, the edge of the aperture further including another surface spaced from the jewels along the line containing the median line of thrust and delimiting a pivot receiving area lying in the line containing said median line of thrust and to one side of the center of setting so that a pivot lying in the said area will be contactable only with portions of said jewels when under thrust and the last mentioned edge of the aperture holding a pivot in place on shock or on a stopping of the apparatus embodying the bearing.

References Cited in the file of this patent

UNITED STATES PATENTS

| Number | Name | Date |
|---|---|---|
| 293,063 | Orser | Feb. 5, 1884 |
| 1,907,792 | Greenleaf | May 9, 1933 |
| 2,265,065 | Daywalt | Dec. 2, 1941 |

FOREIGN PATENTS

| Number | Country | Date |
|---|---|---|
| 638,912 | France | Feb. 28, 1928 |